Feb. 12, 1929.  
J H. LAKIN  
1,701,978  
WATER COOLER  
Filed Feb. 25, 1927  
2 Sheets-Sheet 1
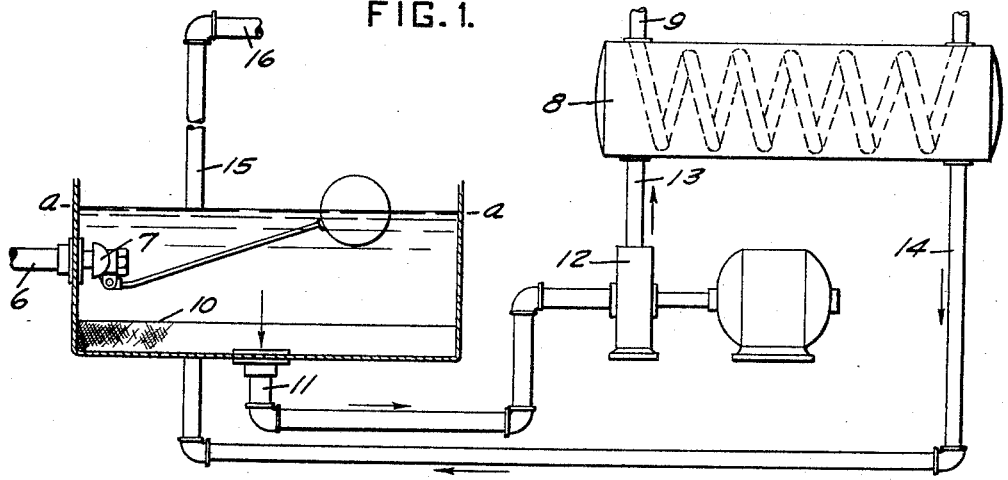
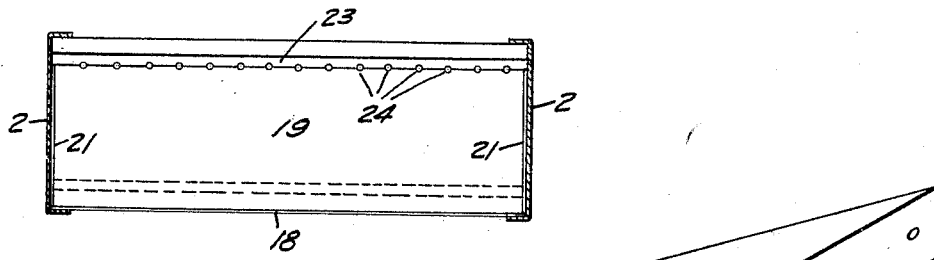
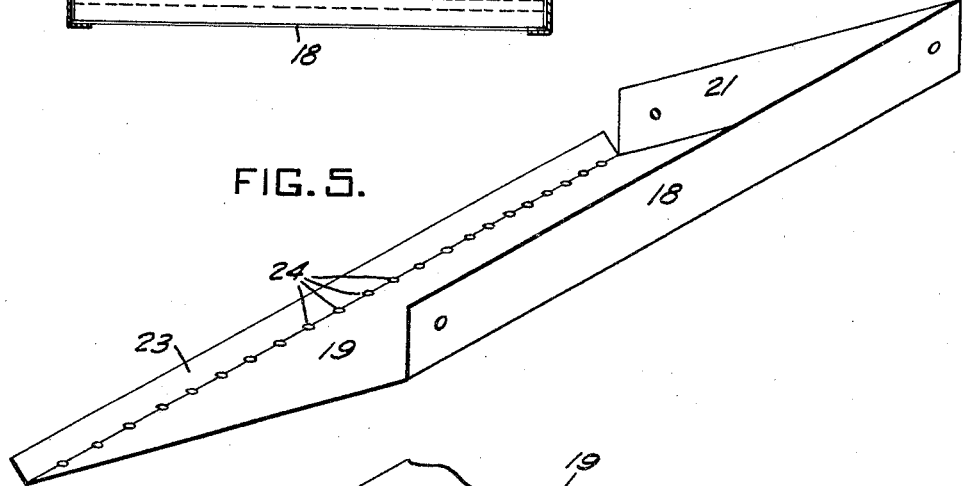
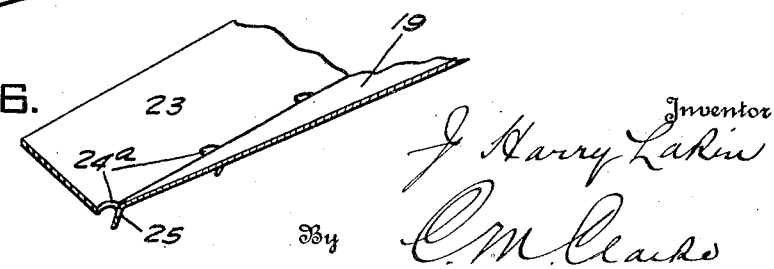
Inventor  
J. Harry Lakin  
By C. M. Clarke  
Attorney Feb. 12, 1929.  
J. H. LAKIN  
WATER COOLER  
Filed Feb. 25, 1927    2 Sheets-Sheet 2  
1,701,978

Inventor  
J. Harry Lakin  
By C. M. Clarke  
Attorney

Patented Feb. 12, 1929.

1,701,978

UNITED STATES PATENT OFFICE.

J HARRY LAKIN, OF PITTSBURGH, PENNSYLVANIA, ASSIGNOR TO LAKIN MANUFACTURING COMPANY, INC., OF PITTSBURGH, PENNSYLVANIA, A CORPORATION OF DELAWARE.

WATER COOLER.

Application filed February 25, 1927. Serial No. 170,802.

My invention relates to improvements in apparatus for re-cooling water, by exposure to and intermingling contact with the atmosphere. The cooling apparatus is particularly designed for use in connection with condensers of refrigerating plants, or for similar purpose, whereby the condensing water surrounding a heat absorbing coil within an enclosing tank may be quickly and effectively re-cooled for continuous re-use.

In condensing apparatus of this class, large amounts of water are ordinarily used with more or less waste and resulting expense. One of the objects of the present invention is to avoid such waste by the continuous circulation and re-use of a main body of water, subjected to atmospheric cooling action, with means for collection, for circulation and return to the uppermost portion of a distributing header, and subsequent cooling by the means herein provided.

Such means, which comprise the subject matter of the present invention, have for their purpose to effect frequent spraying and exposure to the atmosphere through and by means of a series of separated collecting spray pans, with intervening clearance for ample air circulation and contact, so constructed and arranged as to prevent the wasteful action of cross currents of air.

The invention also involves various detail features of construction and operation as shall be more fully hereinafter described.

In the accompanying drawings, showing one preferred embodiment of the invention:

Fig. 1 is a somewhat diagrammatic view, showing the circulating system in connection with a condenser;

Fig. 4 is a cross-section on the line IV—IV of Fig. 3;

Fig. 5 is a perspective detail view of one of the transverse perforated pans;

Fig. 6 is a detail view, showing a modified form of perforation.

Figure 3:
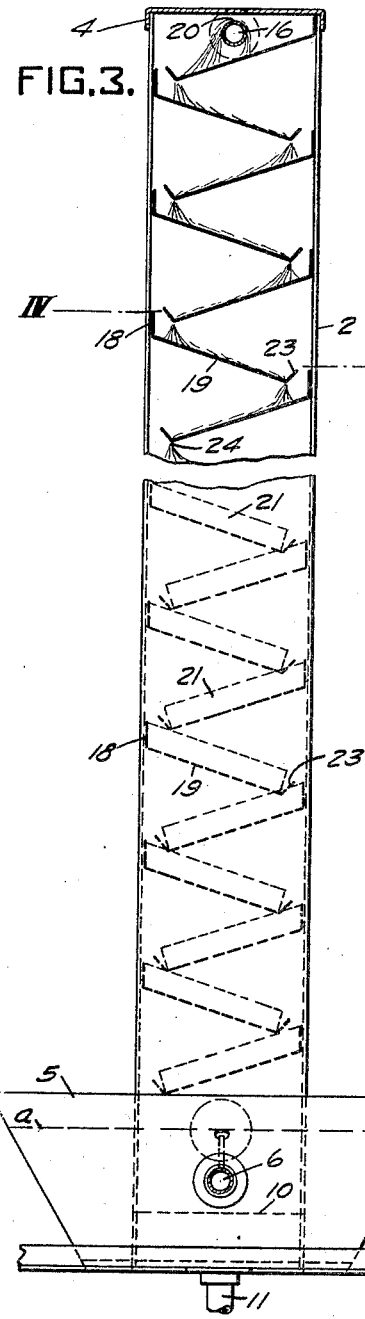
Fig. 3 is an edge elevation, partly in section, of the tower shown in Fig. 2.
Figure 2:
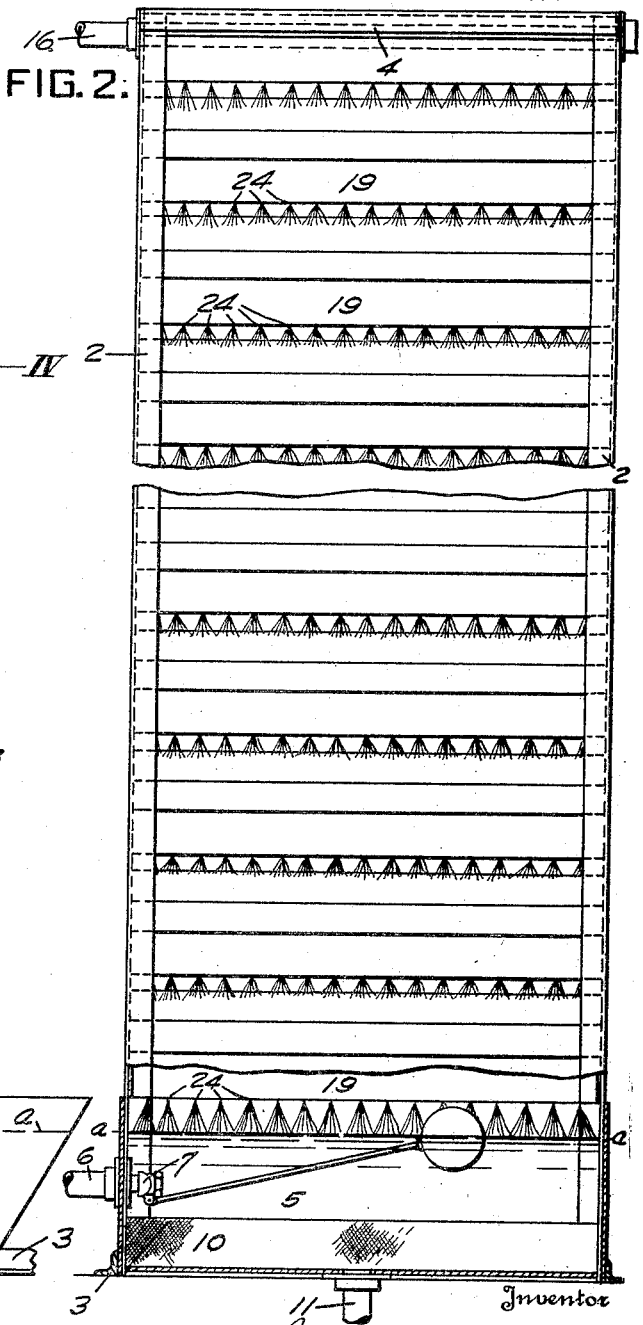
Fig. 2 is a view in elevation, partly in section, of a water distributing and cooling tower embodying the invention.

In the drawings, 2, 2, are the outer supporting framework members for the apparatus, preferably constructed of structural steel members, as channels, and having a supporting base 3 mounted upon any suitable supporting foundation. The channel members 2 extend upwardly throughout the whole length of the tower as shown, and are connected at the top with similar cross members 4, laid over and suitably connected by rivets or bolts in the usual manner of such construction.

In the lower or base portion of the tower is a tank or basin 5, adapted to contain a body of water at or about the normal level $a$. The tank 5, as shown, is of a length coextensive with the transverse length of the tower, but considerably wider at opposite sides, within the capacity of its upwardly diverging walls, extending upwardly from the base 3, and surrounding the base of the tower framing.

Water is initially supplied to the tank 5 for filling up to the normal level, and also for supplementing any exhaust loss thereof by means of a supply pipe 6 connected with a pressure main, opening into the interior through a float-controlled valve 7 whereby to replenish the supply when it falls below the normal line $a$, $a$, and to shut it off when such level is reached.

Tank 5 is for holding and collecting the cooling water for supply to the condenser tank 8 through which passes the circulating condensing coil 9 of any refrigerating system, the cooling water being circulated about such coil in the well known manner for condensing anhydrous-ammonia content therein in gaseous form.

Water for such cooling purpose is taken directly from the lower end portion of tank 5 after being drawn through a protecting screen 10 by suction pipe 11 leading to a pump 12 which supplies such water to one end of the tank 8 by pipe 13.

Under pressure of the pump within the closed tank 8, a corresponding amount of water is returned by pipe 14 to the lower end of a stand pipe 15, by which it is carried to the top of the tower for distribution to the upper end of the spray pan system. At such upper end pipe 15 is extended over by a laterally arranged pipe 16, connected through the end wall 2 of the tower at its top.

Pipe 16 is suitably secured in the opposite end wall 2 by a closing cap and is provided with a longitudinal series of comparatively small spray ports 20. As shown, the opposite narrow sides of the tower are closed by the covering channels or plates 2, protecting the interior from air currents, while the intervening side faces of the tower between the edge portions are free and unobstructed for incoming and outgoing air currents.

Immediately below the spray pipe 16 is the uppermost spray pan of a vertical series, all of which are of the same construction and made of comparatively light sheet metal.

The spray pans are alternately arranged, sloping first in one direction and then in the other so as to provide for an alternating flow throughout the series. Each such spray pan is of generally rectangular shape, as in Fig. 5, and in interfitting connection with the channels 2 by means of upwardly extending angle flanges 21 at the end of each pan, secured by rivets or bolts to channels 2.

The outermost portion of each pan is formed by an upwardly extending wall 18, while the bottom 19 of the pan slopes downwardly and inwardly therefrom toward the opposite side of the tower and is deflected upwardly by an inner water-retaining ledge 23, forming the inner boundary of each pan.

At the angle joint between the bottom 19 and its upwardly turned inner edge 23, and forming the center of a continuous trough so formed, I provide a series of closely adjacent comparatively small perforations 24 in rows. Due to the alternating sloping arrangement of the pans as shown, the terminal gutter and its perforations is located above and closely adjacent to the outer upper edge portion of the next lowermost pan, so that the flow of water is correspondingly alternating, providing for a reverse flow downward to the next lowermost gutter throughout the series.

The distributing ports 20 of pipes 16 are preferably along the upper side of the pipe so that the water will fall downwardly at each side and upon the inclined surface of the first pan, and thereafter throughout the entire series until it is finally delivered in spray form into tank 5.

In Fig. 6 I show a modified construction wherein the holes 24$^a$ are partially punched through the sheet metal, leaving the downwardly turned partly severed blank 25. Such portion acts as a lip or tongue tending to assist in dripping the water downwardly under certain conditions of the supply.

I claim:

1. In water spray mechanism of the class described, a rectangular spray pan made of sheet metal having a main downwardly sloping bottom with an upturned edge providing a collecting channel or gutter and having a series of water distributing circulation ports therethrough and having a series of punched out openings through the bottom with a downwardly extending partially punched drip tongue.

2. In water spray mechanism, the combination of a bottom tank having vertical end walls, a pair of channel shaped vertically arranged supporting frame members secured within the end walls of the tank with their flanges extending inwardly, a channel shaped top member having downwardly extending flanges embracing the tops of the vertical channel members and providing a closing top therefor, a distributing pipe leading from the tank upwardly to the top portion of the supporting frame members and having a horizontal apertured delivery section extending across underneath the channel shaped top member, a series of alternately sloping vertically spaced spray pans extending from the top of the supporting frame to its bottom each having an upstanding flange along its bottom edge providing a lowermost channel with perforations along the bottom thereof and having an oppositely located upstanding flange and endmost upstanding cross flanges for attachment to the flanges and webs respectively of the vertical frame members, the channel portion of each of said pans being located above the opposite upper portion of the next adjacent lower pan, the uppermost of said pans being immediately below the delivery section of the pipe and the lowermost pan delivering into the tank.

In testimony whereof I hereunto affix my signature.

J HARRY LAKIN.